(12) United States Patent
Seno

(10) Patent No.: US 10,796,834 B2
(45) Date of Patent: Oct. 6, 2020

(54) MAGNETIZATION METHOD, MAGNETIZATION APPARATUS AND MAGNET FOR MAGNETIC ENCODER

(71) Applicant: UCHIYAMA MANUFACTURING CORP., Okayama (JP)

(72) Inventor: Hiroshi Seno, Okayama (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 426 days.

(21) Appl. No.: 15/833,741

(22) Filed: Dec. 6, 2017

(65) Prior Publication Data

US 2018/0233261 A1    Aug. 16, 2018

(30) Foreign Application Priority Data

Feb. 15, 2017  (JP) .................................. 2017-026253

(51) Int. Cl.
| | | |
|---|---|---|
| *H01F 13/00* | (2006.01) | |
| *G01D 5/12* | (2006.01) | |
| *H01F 7/02* | (2006.01) | |

(52) U.S. Cl.
CPC .............. *H01F 13/003* (2013.01); *G01D 5/12* (2013.01); *H01F 7/0294* (2013.01)

(58) Field of Classification Search
CPC ....... H01F 13/003; H01F 7/0294; G01D 5/12; G01D 5/245; H02K 15/03

(Continued)

(56) References Cited

U.S. PATENT DOCUMENTS

| | | | | |
|---|---|---|---|---|
| 5,032,947 A | * | 7/1991 | Li ............................ | C21D 1/04 148/108 |
| 5,354,521 A | * | 10/1994 | Goodman ................ | F16L 11/12 264/429 |

(Continued)

FOREIGN PATENT DOCUMENTS

| | | |
|---|---|---|
| EP | 0840095 A1 | 5/1998 |
| JP | 07-249521 A | 9/1995 |

(Continued)

OTHER PUBLICATIONS

WO 0063927, Entire drawings with specification (Year: 1999).*
EP0840095, entire specification with drawings; Magnetic Encoder (Year: 1997).*

*Primary Examiner* — Dharti H Patel
(74) *Attorney, Agent, or Firm* — Muncy, Geissler, Olds & Lowe, P.C.

(57) ABSTRACT

A magnetization method and a magnetization apparatus for forming an objective magnetized state in a one-dimensional region of a magnetic body, and a magnet for a magnetic encoder. In the magnetization method, magnetism in one direction is applied to an entire half wavelength interval of a sine wave on the magnetic body by a magnetizing yoke and a magnetized state of a first-order rectangle wave or of a first-order trapezoidal wave is formed in the interval, the magnetized state presenting polarity information in a rectangle or trapezoidal pulse shape; and thereafter, magnetism in opposite direction is applied to a start point and a terminal point of the interval by the same magnetizing yoke or a different magnetizing yoke one time or several times and the magnetized state of the first-order rectangle wave or of the first-order trapezoidal wave is changed into the objective magnetized state.

10 Claims, 11 Drawing Sheets

(58) Field of Classification Search
 USPC .......................................................... 361/143
 See application file for complete search history.

(56) References Cited

U.S. PATENT DOCUMENTS 5,557,248 A * 9/1996 Prochazka ............ H01F 13/003
 335/284
2009/0206827 A1 * 8/2009 Aimuta .................. G01D 5/145
 324/207.25

FOREIGN PATENT DOCUMENTS

JP     2002-164213 A    6/2002
WO    WO 00/63927 A1   10/2000

* cited by examiner

MAGNETIZATION METHOD, MAGNETIZATION APPARATUS AND MAGNET FOR MAGNETIC ENCODER

BACKGROUND OF THE INVENTION

Field of the Invention

The present invention relates to a magnetization method and a magnetization apparatus for forming a magnetized state of a sine wave that presents at least a half wavelength pulse of the sine wave in a one-dimensional region of a magnetic body, specifically a magnetic body being a body capable of acquiring the property of magnetism (hereinafter referred to as a magnetic body), and a magnet for a magnetic encoder formed with a magnetized state that presents at least the half wavelength pulse of the sine wave in the one-dimensional region of the magnetic body.

Description of the Related Art

In a conventionally known method for magnetizing a magnet for a motor or a magnet for a magnetic encoder, a magnetic region for magnetization is collectively applied to an entire magnetic body by a multipolar yoke (for instance, Patent Literature 1) or the magnetic region for magnetization is applied to each part while a monopolar yoke is relatively moved to the magnetic body (for instance, Patent Literature 2). In either method of the above, a voltage or an electric charge at a constant level is supplied to a coil of a magnetizing yoke by on-off control.

CITATION LIST

Patent Literature

PTL 1: Japanese Unexamined Patent Application Publication No. 1995-249521
PTL 2: Japanese Unexamined Patent Application Publication No. 2002-164213

SUMMARY OF THE INVENTION

Problems to be Solved by the Invention

In a specific magnetic encoder, for preventing malfunction of a machine or the like, polarity information in which a magnet presents a sine wave or a half wavelength pulse of the sine wave to a magnetic sensor needs to be outputted. Conventionally, such a magnet is magnetized by adjusting width of a magnetization region, a space between magnetization regions formed in the magnetic body, instead of control in an analog manner in which an electric current that is supplied to the coil wound and placed around the magnetizing yoke, which is explained in the reference drawings below.

FIG. 11A is a state chart of the magnet for the magnetic encoder in which the magnetization region is formed normally. FIG. 11B is a state chart of the magnet for the magnetic encoder in which the magnetization region is formed in an imbalanced manner. FIG. 11C is a graphic chart of a detection signal of the magnetic sensor. In a magnet 2, a one-dimensional region is defined and a plurality of magnetic poles, i.e. a north pole and a south pole, are formed in the region. A magnetic sensor S relatively moves along the region and detects magnetic flux density in direction orthogonal to the region, i.e. in upper direction of paper.

In FIG. 11A, the north pole and the south pole that have equal width with a non-magnetized region interposed therebetween are formed with equal spaces in the one-dimensional region of the magnet 2. In such a case, a detection signal of the detection sensor S is illustrated by a solid line graph of FIG. 11C. A central position of a plus-side peak of the graph corresponds to a center of the north pole, and a central position of a minus-side peak of the graph corresponds to a center of the south pole, which is because the magnetic flux above the north pole or the south pole is substantially vertical in direction. A zero crossing point corresponds to a midpoint between the north pole and the south pole, which is because the magnetic flux above the midpoint between the north pole and the south pole is substantially horizontal in direction. By adjusting the width of the magnetization region and the space of the magnetization regions as above, output of the magnet 2, i.e. the polarity information, is deemed as a similar waveform of the sine wave.

However, the similar waveform is quite different from an ideal waveform; for instance, a wide range of a peak part of the similar waveform is collapsed. The longer the wavelength of the sine wave becomes, the more distinctive the difference becomes. There is a problem such that defect of the shape of the magnetizing yoke, position aberration in the process of magnetization, or the like easily has adverse effect on accuracy of the waveform.

One example is explained below with reference to FIG. 11B. In the magnet 2, the magnetization region is formed in the imbalanced manner because of defect of the shape of the magnetizing yoke, the position aberration, a change in temperature, or the like.

Specifically, when compared with FIG. 10A, the north pole is formed wider and the south pole is formed narrower. In such a case, the detection signal of the magnetic sensor is illustrated by a broken line graph of FIG. 10C. When compared with the solid line graph, a central position of a peak in the broken line graph does not change but a position of a zero crossing point in the broken line graph changes. Such a change of the position of the zero crossing point may have great influence on a performance of the magnetic encoder. The change of the position of the zero crossing point is suppressed if the north pole and the south pole become adjacent to each other, i.e. the space between the magnetization regions become narrow. However, in such a case, the peak part of the waveform becomes collapsed widely, resulting in a trapezoidal wave.

The present invention is proposed in view of the above-mentioned problems. An object of the present invention is to form the magnetization region so as to output a satisfactory sine wave in the magnetization method and apparatus for forming the magnetized state of the sine wave that presents at least the half wavelength pulse of the sine wave in a one-dimensional region of the magnetic body.

Means of Solving the Problems

In a magnetization method of the present invention for forming an objective magnetized state presenting a half wavelength pulse of a sine wave in a one-dimensional region of a magnetic body, magnetism in one direction is applied to an entire half wavelength interval of the sine wave on the magnetic body by a magnetizing yoke and a magnetized state of a first-order rectangle wave or of a first-order trapezoidal wave is formed in the interval, the magnetized state presenting polarity information in a rectangle or trapezoidal pulse shape; and thereafter, magnetism in opposite direction is applied to a start point and a terminal point of the interval by the same magnetizing yoke or a different magnetizing yoke one time or several times and the magnetized state of the first-order rectangle wave or of the first-order trapezoidal wave is changed into the objective magnetized state.

In a magnetization apparatus of the present invention having a plurality of magnetizing yokes and forming an objective magnetized state presenting at least a half wavelength pulse of a sine wave in a one-dimensional region of a magnetic body, magnetism in one direction is applied to an entire half wavelength interval of the sine wave on the magnetic body by a first yoke in the plurality of magnetizing yokes and a magnetized state of a first-order rectangle wave or of a first-order trapezoidal wave presenting polarity information in a rectangle or trapezoidal pulse shape is formed in the interval; and thereafter, magnetism in opposite direction is applied to a start point and a terminal point of the interval by a yoke that is different from the first yoke in the plurality of magnetizing yokes one time or several times and the magnetized state of the first-order rectangle wave or of the first-order trapezoidal wave is changed into the objective magnetized state.

In a magnetization apparatus of the present invention having a magnetizing yoke and forming an objective magnetized state presenting at least a half wavelength pulse of a sine wave in a one-dimensional region of a magnetic body, magnetism in one direction is applied to an entire half wavelength interval of the sine wave on the magnetic body while the magnetizing yoke is relatively moved to the magnetic body and a magnetized state of a first-order rectangle wave or of a first-order trapezoidal wave presenting polarity information in a rectangle or trapezoidal pulse shape is formed in the interval; and thereafter, magnetism in opposite direction is applied to a start point and a terminal point of the interval one time or several times while the magnetizing yoke is relatively moved to the magnetic body and the magnetized state of the first-order rectangle wave or of the first-order trapezoidal wave is changed into the objective magnetized state.

In a magnet for a magnetic encoder of the present invention formed with a magnetized state presenting at least a half wavelength pulse of a sine wave in a one-dimensional region of a magnetic body, position tolerance at a zero crossing point of the sine wave is equal to or less than one twelfth of the sine wave.

Effects of the Invention

In the present invention, magnetism in one direction is applied to the entire half wavelength interval of the sine wave on the magnetic body and, in the interval, the magnetized state of the first-order rectangle wave or of the first-order trapezoidal wave that presents the polarity information in the rectangle or trapezoidal pulse shape is formed. And thereafter, magnetism in opposite direction is applied to the start point and the terminal point of the interval one time or several times and the magnetized state is changed into the objective magnetized state presenting the half wavelength pulse of the sine wave. Namely, after the magnetized state of the first-order rectangle wave or of the first-order trapezoidal wave that presents the polarity information in the rectangle or trapezoidal pulse shape is formed in the half wavelength interval of the sine wave, the start point and the terminal point of the magnetization region are demagnetized. Therefore, the polarity information that presents the waveform in which both sides of the peak part is smoothly slanted, i.e. a satisfactory waveform, is obtained.

In the present invention, because magnetism is applied to the entire half wavelength interval of the sine wave on the magnetic body in forming the magnetized state of the first-order rectangle wave or of the first-order trapezoidal wave, a non-magnetized region hardly remains in the interval. Because the position of the zero crossing point of the sine wave is specified by demagnetization as mentioned above, a change of the position is suppressed. Specifically, when the present invention is applied to the magnet for the magnetic encoder, the position tolerance at the zero crossing point of the sine wave is able to be suppressed within one twelfth wavelength of the sine wave.

DESCRIPTION OF THE EMBODIMENTS

A magnetization method by the present invention is explained below.

Figure 1A:
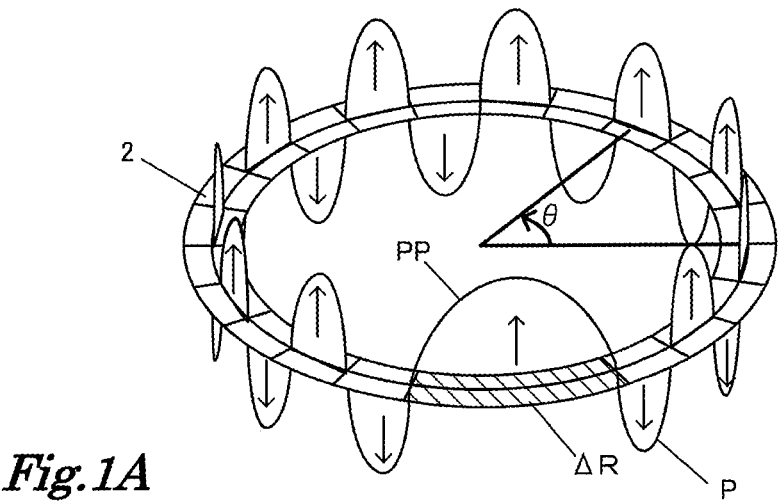
FIGS. 1A to 1C are all examples of a multipolar magnet manufactured by the magnetization method of the present invention.
Figure 1B:
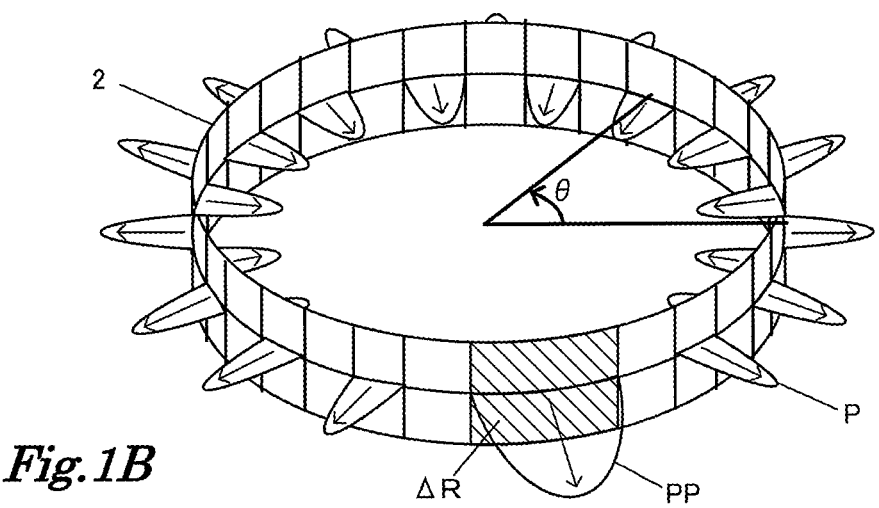
Figure 1C:
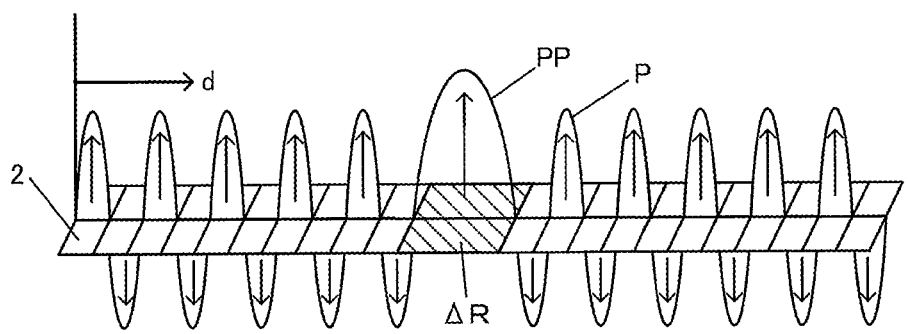

FIGS. 1A to 1C are all examples of a multipolar magnet for a magnetic encoder magnetized by the embodiment. A type of a magnet 2 is not limited specifically and the magnet 2 can be, for instance, an iron-chromium-cobalt magnet casted by using iron, chromium, and cobalt as main components, a bonded magnet into which ferrite powder or the like is kneaded into rubber or plastic, or a rare-earth magnet manufactured by using rare earth such as neodymium. In the embodiment, the shape of the magnet 2 is not limited specifically.

The magnet 2 illustrated in FIG. 1A has a disk-shaped region. The disk-shaped region is one-dimensional and a position of the disk-shaped region is specified only by an angle θ. In the disk-shaped region, a plurality of north poles and south poles are formed. A sine wave that oscillates on an orthogonal face to the disk-shaped region is polarity information presented by the north poles and the south poles. In the magnetic encoder, the polarity information is detected by a magnetic sensor. The polarity information is a function of the angle θ, and a value of the function shows the value of magnetic flux density of a specific direction, i.e. an orthogonal direction, in respective positions of the region. The value of the magnetic flux density is a value combined by magnetism communicating the north pole and the south pole and does not show the magnetized state itself in the position of the region.

The magnet 2 illustrated in FIG. 1B has a cylindrical region. The cylindrical region is also one-dimensional and a position of the cylindrical region is specified only by an angle θ. In the cylindrical region, a plurality of north poles and south poles are formed. A sine wave that oscillates on an orthogonal face to the cylindrical region is polarity information presented by the north poles and the south poles.

The magnet 2 illustrated in FIG. 1C has a narrow-plate region. The narrow-plate region is also one-dimensional and a position of the narrow-plate region is specified only by a distance "d" from an end. In the narrow-plate region, a plurality of north poles and south poles are formed. A sine wave that oscillates on an orthogonal face to the narrow-plate region is polarity information presented by the north poles and the south poles.

In all of FIGS. 1A to 1C, the polarity information is basically continuous sine waves and a half wavelength pulse PP is a longer wavelength, about several centimeters longer than a half wavelength pulse P other than the half wavelength pulse PP. An object of the present invention is to form a magnetized state that presents, in a magnetic body to be the magnet 2, such a long wavelength sine wave or the half wavelength PP of the long wavelength. The half wavelength PP of the long wavelength sine wave is suitable, for instance, for a sign showing a zero crossing point in the magnet for the magnetic encoder.

In FIGS. 1A to 1C, a hatched region ΔR illustrates a half wavelength interval of the sine wave on the magnetic body.

Mathematic matters, the basics for the magnetized method, are explained briefly. A rectangle wave f(x) is represented as a superimposition of the sine wave in odd order by Fourier transformation.

$$f(x) = \sum_{n=1}^{\infty} b_n \sin(nx) = \left| \sum_{n=1}^{\infty} \frac{4}{\pi} \cdot \frac{1}{2n-1} \sin\{(2n-1)x\} \right| = \frac{4}{\pi} \left\{ \sin(x) + \frac{1}{3}\sin(3x) + \frac{1}{5}\sin(5x) \right\}$$ [Formula 1]

By modifying the above formula, a first-order sine wave is represented as a superimposition of the rectangle wave and a harmonic of odd order that is equal to or more than three.

$$\sin(x) = \frac{\pi}{4} f(x) - \frac{1}{3}\sin(3x) - \frac{1}{5}\sin(5x) - \cdots$$ [Formula 2]

A trapezoidal wave presenting a waveform in which a start point and a terminal point of a rectangle wave become blunt is also represented as the superimposition of the sine wave in odd order by Fourier transformation, i.e. as a formula such as Formula 1, similar to the above. However, a coefficient in each member of the formula is different from Formula 1. By modifying the formula, the first-order sine wave is represented as the superimposition of the trapezoidal wave and the harmonic of odd order that is equal to or more than three.

A method for forming the magnetized state (hereinafter referred to as an objective magnetized state) that presents the long wavelength sine wave (corresponding to the above-mentioned sin (x), hereinafter referred to as an objective sine wave) in the magnetic body is assumed to have following processes.

First, predetermined magnetism is applied to the magnetic body and the magnetized state of the first-order rectangle wave or of the first-order trapezoidal wave that presents the polarity information in the first-order rectangle wave, corresponding to the above-mentioned f(x), or first-order trapezoidal wave is formed. The first-order rectangle wave or the first-order trapezoidal wave is in the same wavelength and a same phase with the objective sine wave. Thereafter, by further applying the predetermined magnetism to the magnetic body, a third-order harmonic magnetized state is formed in a superimposed manner, the third-order harmonic magnetized state presents a third-order harmonic, corresponding to sin (3x), being an opposite phase to the objective sine wave. Thereafter, when a fifth to n-th magnetized state presenting a fifth-order harmonic, corresponding to sin (5x), being an opposite phase to the objective sine wave is formed in the superimposed manner by further applying the predetermined magnetism to the magnetic body, the objective magnetized state is obtained eventually. In the above-mentioned case, oscillation of the first-order rectangle wave or of the first-order trapezoidal wave and oscillation of the third-order harmonic, the fifth to n-th harmonics are adjusted corresponding to the coefficient of each member in Formula 2.

First, the above-mentioned method is explained below with reference to graphic charts in a case of forming the magnetized state of the first-order rectangle wave.

Figure 2A:
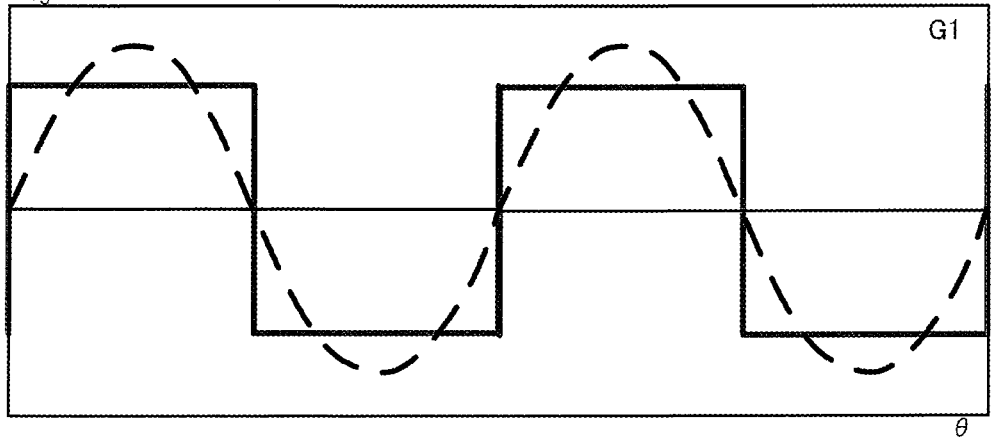
FIGS. 2A to 2C are graphic charts illustrating an example of the magnetized state in the method.
Figure 2B:
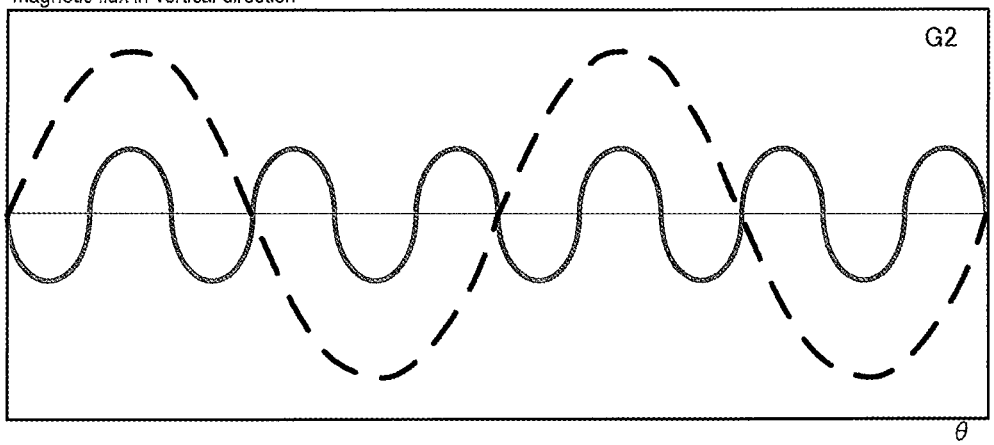
Figure 2C:
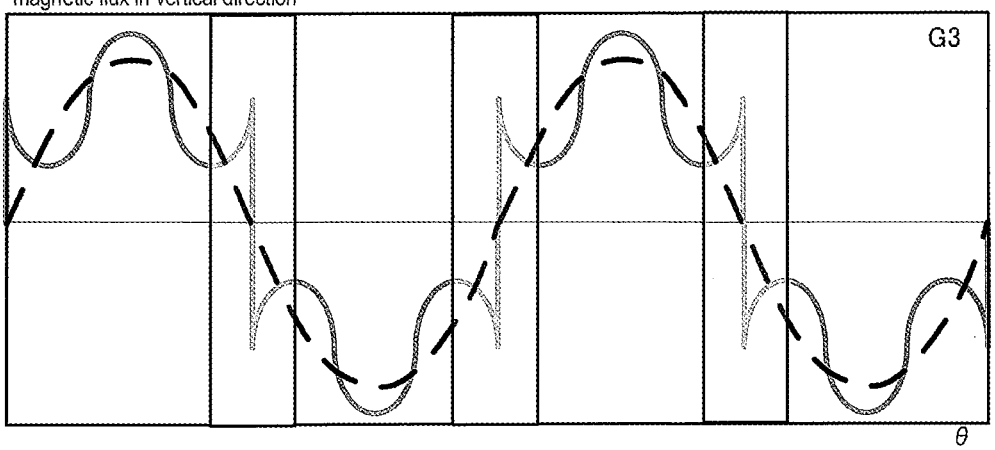

FIGS. 2A to 2C are graphic charts illustrating each step of a magnetization treatment. In the figures, a horizontal axis illustrates a position of the one-dimensional region of the magnetic body to be the magnet 2, and a vertical axis illustrates a size of magnetic flux of specific direction in respective positions of the one-dimensional region of the magnetic body to be the magnet 2. The figures illustrate an amount of two wavelength intervals of the objective sine wave.

In a graphic chart G1 of FIG. 2A, the magnetized state of the first-order rectangle wave that presents the first-order rectangle wave is illustrated by a solid line. For the purpose of comparison, the objective sine wave is illustrated by a broken line. Although the waveform of such a complete rectangle wave is mathematically obtained, the magnetized state having a similar waveform to the above is formed if magnetism at a constant level is applied while switching direction of magnetism at every half wavelength interval.

In a graphic chart G2 of FIG. 2B, the third-order harmonic magnetized state presenting the third-order harmonic is illustrated by the solid line. For the purpose of comparison, the objective sine wave is illustrated by the broken line. Such a magnetized state is formed, for instance, if magnetism of the same direction with a half wavelength pulse of the third-order harmonic is applied at a central part of the pulse at every half wavelength of the third-order harmonic, which is achieved because the wavelength of the third-order harmonic is short. Namely, when limited to a case in which the wavelength of the sine wave is short, the magnetized state that presents the half wavelength pulse of the sine wave is obtained only by applying magnetism at the constant level to a central part of the half wavelength of the sine wave.

When the oscillation of the first-order rectangle wave is set as 1, it is accurate to set the oscillation of the third-order harmonic as −0.425 according to Formula 2, but the oscillation can practically be set within a range from −0.7 to −0.2, or preferably within a range from −0.5 to −0.3.

A graphic chart G3 of FIG. 2C illustrates a magnetized state after superimposing the third-order harmonic magnetized state illustrated in the graphic chart G2 on the magnetized state of the first-order rectangle wave illustrated in the graphic chart G1. For the purpose of comparison, the objective sine wave is illustrated by the broken line. Only by superimposing the third-order harmonic magnetized state on the magnetized state of the first-order rectangle wave as mentioned above, the magnetized state that presents the waveform of the objective sine wave is obtained. The magnetized state illustrated in the graphic chart G3 can be deemed as the objective magnetized state. A sharp peak represented at the zero crossing point is remains of steep edges of the start point and the terminal point of the first-order rectangle wave. The peak becomes less distinctive in the trapezoidal wave in which edges of the start point and the terminal point become blunt, to be mentioned below. Such a sharp edge does not occur in an actual magnet 2.

Figure 3A:
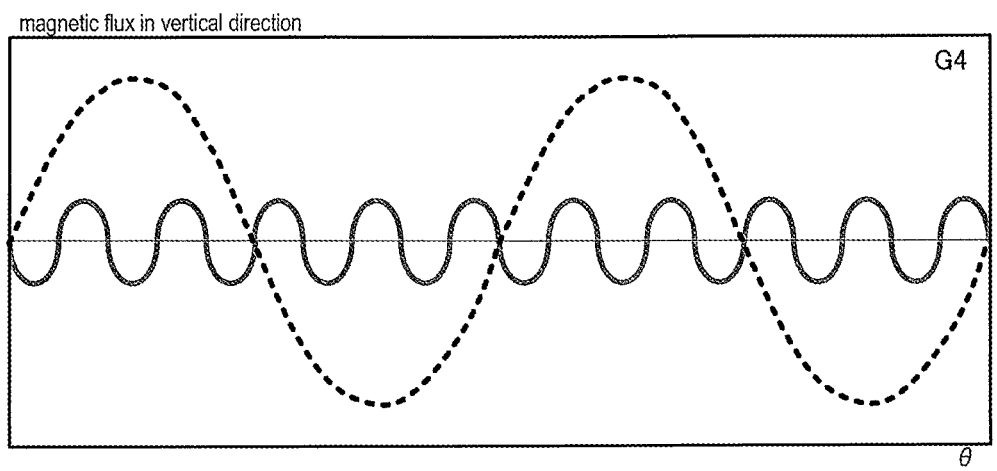
FIGS. 3A and 3B are graphic charts illustrating another magnetized state in the method.
Figure 3B:
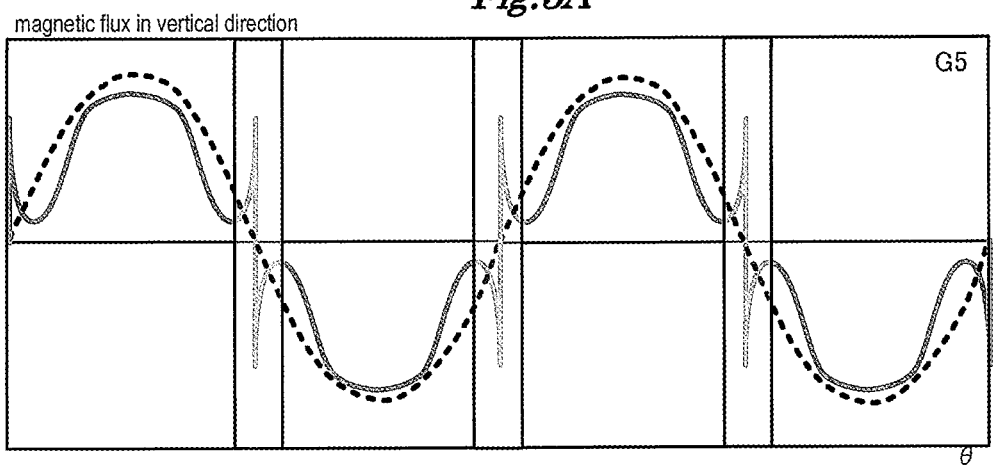

FIGS. 3A and 3B are graphic charts illustrating a magnetized state of another step in the above-mentioned method. In a graphic charts G4 and G5 of FIGS. 3A and 3B, a horizontal axis illustrates the position of the one-dimensional region of the magnetic body to be the magnet 2, and a vertical axis illustrates the size of the magnetic flux of the specific direction in the respective positions of the region.

The graphic chart G4 of FIG. 3A illustrates the fifth-order harmonic magnetized state that presents the fifth-order harmonic by the solid line. For the purpose of comparison, the objective sine wave is illustrated by the broken line. Such a magnetized state is formed if, for instance, at every half wavelength pulse of the fifth-order harmonic, magnetism at the constant level of the same direction with the pulse is applied to a central part of the pulse. When the oscillation of the first-order rectangle wave is set as 1, it is accurate to set oscillation of the fifth-order harmonic as −0.255 according to Formula 2, but the oscillation can practically be within a range from −0.4 to −0.1, or preferably within a range from −0.3 to −0.15.

The graphic chart G5 of FIG. 3B is a graphic chart illustrating a magnetized state after superimposing the fifth-order harmonic magnetized state illustrated in the graphic chart G4 on the third-order harmonic magnetized state illustrated in the graphic chart G3 of FIG. 2C. For the purpose of comparison, the objective sine wave is illustrated by the broken line. Thereby, a magnetized state that presents a more satisfactory waveform of the objective sine wave is obtained, and the magnetized state as mentioned above can be deemed as the objective magnetized state.

Figure 4A:
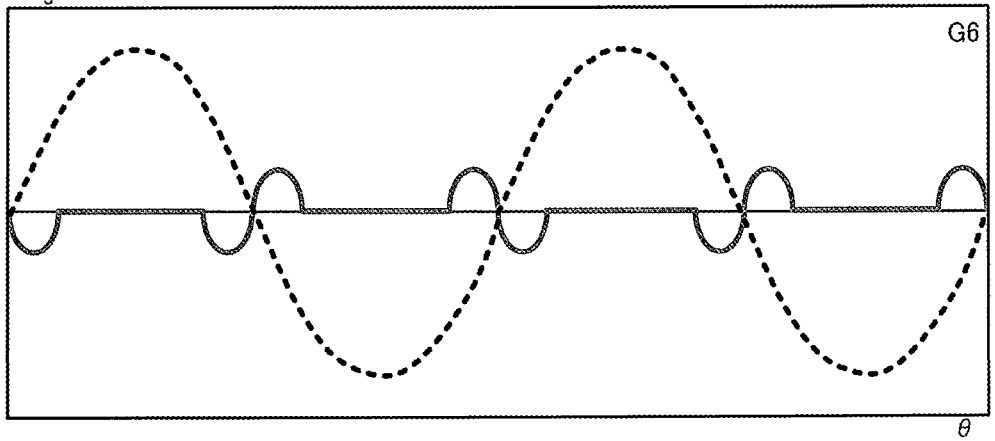
FIGS. 4A and 4B are graphic charts illustrating another magnetized state in the method.
Figure 4B:
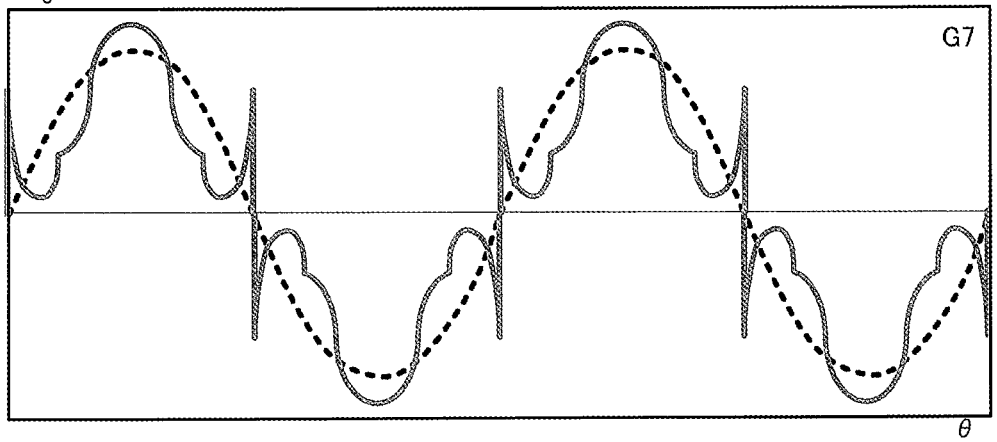

FIGS. 4A and 4B are graphic charts illustrating another magnetized state in the above-mentioned method. In the figures, a horizontal axis illustrates the position of the one-dimensional region of the magnetic body to the magnet 2, and a vertical axis illustrates the size of the magnetic flux of the specific direction in the respective position of the region. The figures illustrate the amount of the two wavelength intervals of the objective sine wave.

A graphic chart G6 of FIG. 4A illustrates another example of the fifth-order harmonic magnetized state by the solid line. The fifth-order harmonic magnetized state presents the half wavelength pulse of the fifth-order harmonic respectively in one fifth of regions on the start point side and the terminal point side of the half wavelength interval but three fifths of region of a central part of the half wavelength interval remains flat. Such a magnetized state is formed if, for instance, magnetism at the constant level is applied respectively to a central part of the one fifth of the regions on the start point side and the terminal point side of the half wavelength interval.

A graphic chart G7 of FIG. 4B illustrates a graphic chart illustrating a magnetized state after superimposing the fifth-order harmonic magnetized state illustrated in the graphic chart G6 on the third-order harmonic magnetized state illustrated in the graphic chart G3 of FIG. 2C. For the purpose of comparison, the objective sine wave is illustrated by the broken line. Thereby, a magnetized state in which oscillation of a central part presents large waveform is obtained, and the magnetized state can be deemed as the objective magnetized state.

In the above magnetized state that is explained as the another example of the fifth-order harmonic magnetized state, the half wavelength pulse of the fifth-order harmonic in the one fifth of the regions on the start point side and the terminal point side of the half wavelength interval is presented and the three fifths of the region of the central part of the half wavelength interval remains flat, and the magnetized state is able to be performed similarly in the third-order harmonic magnetized state. Namely, the third-order harmonic magnetized state can be a magnetized state in which the half wavelength pulse of the third-order harmonic is presented respectively in one third of the regions on the start point side and the terminal point side of the half wavelength interval and one third of the region of the central part of the half wavelength interval is flat. The third-order harmonic magnetized state is formed, for instance, by applying magnetism at the constant level to a central part of the respective one third of the regions on the start point side and the terminal point side of the half wavelength interval.

Next, the above method is explained with reference to graphic charts in the case of forming the magnetized state of the first-order trapezoidal wave.

Figure 5A:
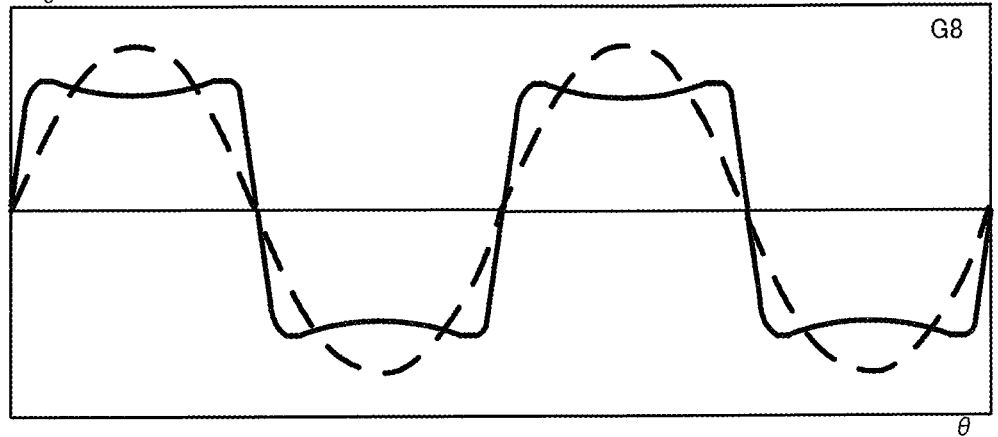
FIGS. 5A to 5C are graphic charts illustrating another example of the magnetized state in the method.
Figure 5B:
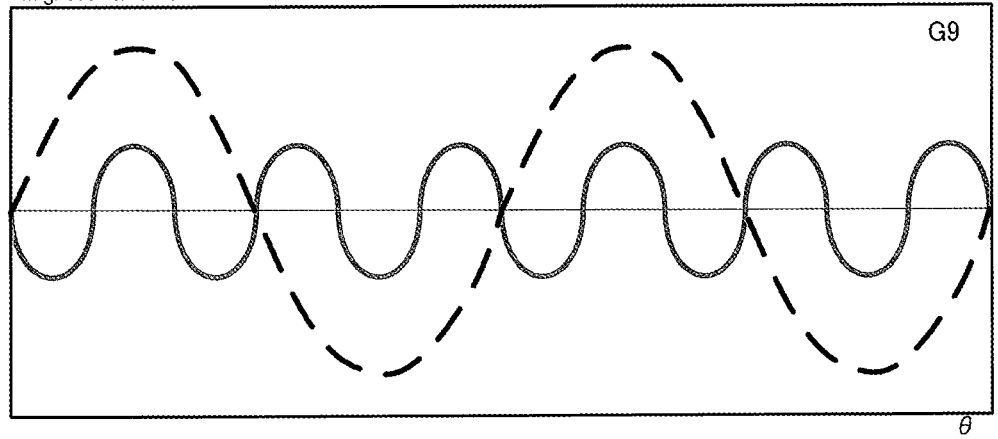
Figure 5C:
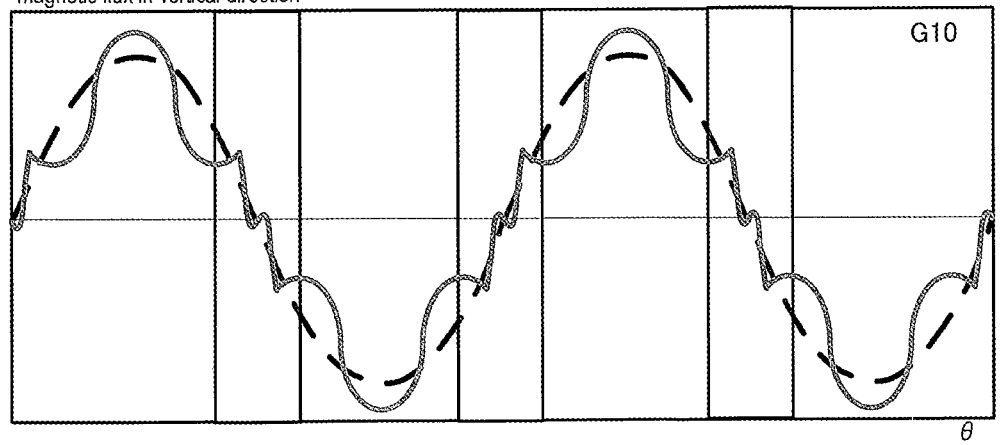

FIGS. 5A to 5C are graphic charts illustrating the magnetized state in each step.

A graphic chart G8 of FIG. 5A illustrates the first-order trapezoidal wave magnetized state that presents the first-order trapezoidal wave by the solid line. For the purpose of comparison, the objective sine wave is illustrated by the broken line. The first-order trapezoidal wave is exemplified in the waveform close to reality. Such a magnetized state is formed if magnetism at the constant level is applied to slight narrower range than the interval while switching the direction of magnetism at every half wavelength interval.

In a graphic chart G9 of FIG. 5B, the third-order harmonic magnetized state presenting the third-order harmonic the same as the graphic chart G2 is illustrated by the solid line. For the purpose of comparison, the objective sine wave is illustrated by the broken line. When the oscillation of the first-order rectangle wave is set as 1, the oscillation of the third-order harmonic can practically be set within the range from −0.7 to −0.2, or preferably within the range from −0.5 to −0.3.

A graphic chart G10 of FIG. 5C illustrates a magnetized state after superimposing the third-order harmonic magnetized state illustrated in the graphic chart G9 on the first-order trapezoidal magnetized state illustrated in the graphic chart G8. For the purpose of comparison, the objective sine wave is illustrated by the broken line. When the third-order harmonic magnetized state is superimposed on the first-order trapezoidal magnetized state, a magnetized state that presents a more satisfactory waveform of the objective sine wave than the graphic chart G2 of FIG. 2C is obtained. Namely, as compared with the graphic chart G2, the sharp peak does not appear at the zero crossing point, which is because the start point and the terminal point of the first-order trapezoidal wave are blunt as compared with the first-order rectangle wave. The magnetized state illustrated in the graphic chart G10 can be deemed as the objective magnetized state.

Needless to say, the magnetized state illustrated in the graphic chart G10 is able to be further superimposed with the fifth-order harmonic magnetized state, which is substantially similar to FIGS. 3A, 3B, 4A, and 4B, and the explanation is omitted.

A basic idea of the magnetization method of the present invention is as mentioned above. The above method is summarized as follows regarding a case of forming the objective magnetized state presenting the half wavelength pulse of the objective sine wave.

First, magnetism in one direction is applied to an entire half wavelength interval of the sine wave on the magnetic body to be the magnet by a magnetizing yoke, and the magnetized state of the first-order rectangle wave or of the first-order trapezoidal wave that presents the polarity information in the shape of the rectangle or trapezoidal pulse (the half wavelength pulse of the first-order rectangle wave or the first-order trapezoidal wave) is formed in the interval. Thereafter, magnetism in opposite direction is applied to the start point and the terminal point of the interval by the same magnetizing yoke or a different magnetizing yoke one time or several times and the magnetized state of the first-order rectangle wave or of the first-order trapezoidal wave is changed into the objective magnetized state.

Magnetism in opposite direction applied to the start point and the terminal point of the interval for a first time is magnetism that forms, in the magnetic body, a third-order harmonic magnetization region presenting a half wavelength pulse of an opposite phase of the third-order harmonic of the objective sine wave and can be applied respectively to one third of the regions on the start point side and the terminal point side of the interval.

Magnetism in opposite direction applied to the start point and the terminal point of the interval for a second time is magnetism that forms, in the magnetic body, a fifth-order harmonic magnetization region presenting a half wavelength pulse of an opposite phase of the fifth-order harmonic of the objective sine wave and can be applied respectively to one fifth of the region on the start point side and the terminal point side of the interval.

In the above magnetization method, when the magnetized state of the first-order rectangle wave or of the first-order trapezoidal wave is formed, magnetism is applied to the entire half wavelength interval of the objective sine wave on the magnetic body. As a result, a non-magnetized region hardly remains in the interval. As illustrated with a colored region in FIGS. 2C and 3B, a position of a zero crossing point of the objective sine wave is decided by the third-order harmonic or the fifth-order harmonic that is superimposed at a part of the zero crossing point.

Therefore, in the magnetic body magnetized by the above magnetization method, for instance, in the magnet for the magnetic encoder, tolerance at the zero crossing point of the objective sine wave is suppressed within a range between peaks in the third-order harmonic, i.e. one sixth wavelength of the objective sine wave. If the waveform of the third-order harmonic is satisfactory, the tolerance at the zero crossing point of the objective sine wave is suppressed into half of the range between the peaks in the third-order harmonic, i.e. one twelfth wavelength of the objective sine wave.

Or the tolerance at the zero crossing point of the objective sine wave is suppressed within a range between peaks in the fifth-order harmonic, i.e. one tenth of the objective sine wave. If the waveform of the fifth-order harmonic is satisfactory, the tolerance at the zero crossing point of the objective sine wave is suppressed into half of the range between the peaks in the fifth-order harmonic, i.e. one twentieth wavelength of the objective sine wave.

Figure 6A:
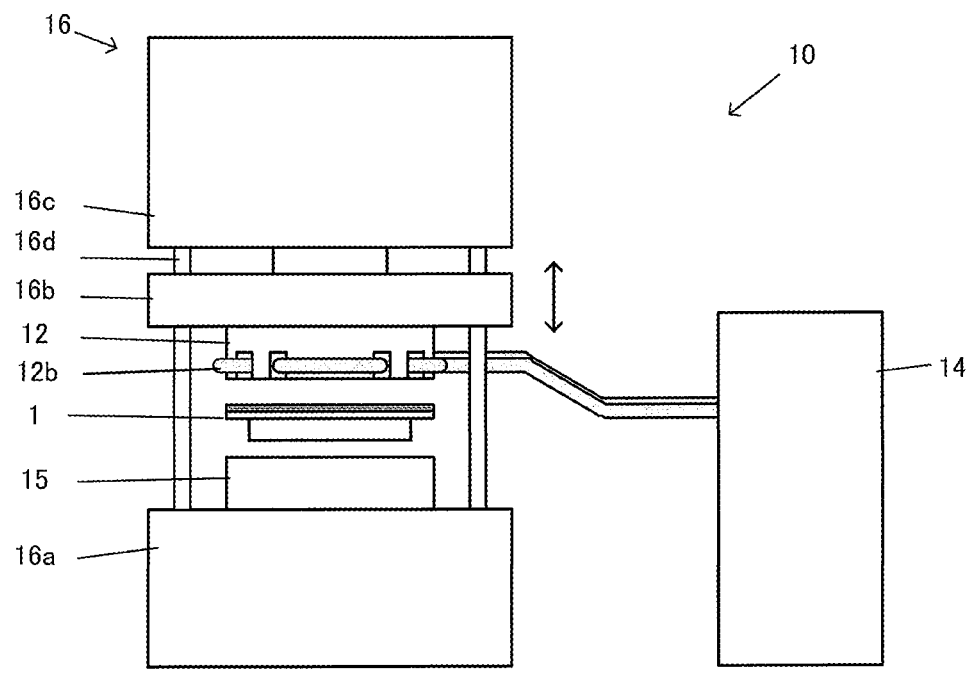
FIG. 6A is an entire front view of a magnetization apparatus as an example of an embodiment.
Figure 6B:
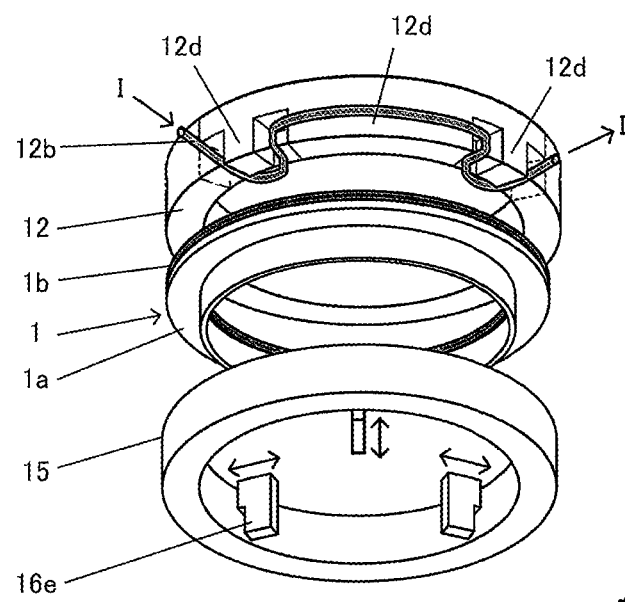
FIG. 6B is a perspective view of a magnetizing yoke, a magnetic body to be magnetized, and a pressing tool of the magnetization apparatus.

A magnetization apparatus as one example of the embodiment is explained below. FIG. 6A is an entire front view of the magnetization apparatus and FIG. 6B is a perspective view of a magnetizing yoke, a magnetic body to be magnetized, and a pressing tool of the magnetization apparatus.

A magnetization apparatus 10 is constituted with a magnetizing yoke 12, a power supply device 14, and an elevator device 16.

In the elevator device 16, a base 16a (a stationary plate) and a power cylinder 16c are held by a plurality of columnar supports 16d with a predetermined space therebetween. The elevator device 16 has a basic structure in which a movable plate 16b is guided by the columnar supports 16d and is moved up and down by the power cylinder 16c. The magnetizing yoke 12 is fixed to the movable plate 16b and a receiving tool 15 is fixed to the base 16a.

In a magnetic body 1, a magnetic member 1b is fixed to a surface of a core member 1a in a circular shape. The core member 1a is made of magnetic metal such as SPCC, and SUS 430. In some cases, non-magnetic metal such as aluminum alloy, copper alloy, and SUS 305, is adoptable for the core member 1a. A central part of a back face of the core member 1a is formed with a projection portion in a cylindrical shape. The projection portion has an outer diameter fixed to an inner hole of the receiving tool 15. The magnetic member 1b is a rubber molding article, a resin molding article in which hard magnetic powder such as alnico and ferrite is contained, or sinter of the hard magnetic powder. The magnetic member 1b is fixed so as to cover an entire surface of the core member 1a. An inner diameter and an outer diameter of the magnetic body 1 substantially correspond to an inner diameter and an outer diameter of the magnetizing yoke 12 and of the receiving tool 15.

Although a detailed shape of the magnetizing yoke 12 is to be mentioned below, the magnetizing yoke 12 is basically a cylindrical shaped member that is formed by soft magnetic material such as pure iron or permendur, and an end face on one side is formed with a plurality of magnetic poles. A coil 12b is wound between the magnetic poles and is connected to the power supply device 14 installed in the vicinity of the coil 12b.

The receiving tool 15 is a cylindrical member made of a material different from the magnetizing yoke 12, for instance, of the non-magnetic material such as SUS 305, and has an inner diameter and an outer diameter that are substantially similar to the magnetizing yoke 12. A plurality of chucks 16e are arranged within the inner hole of the receiving tool 15. The chuck 16e is structured so as to move forward or backward relative to an inner circumferential face of the inner hole of the receiving tool 15 by a structure not shown in figures.

In the embodiment, a plurality of magnetizing yokes 12 in which shapes and numbers of the magnetic poles are different from each other are used, to be mentioned below. Therefore, a magnetizing yoke of a switching type is suitable for the magnetization apparatus 10, but a magnetization apparatus 10 dedicated to each of the magnetizing yokes 12 can be used.

As a preparation for the magnetization treatment, the magnetic body 1 is set to the magnetization apparatus 10, which is performed by the following process. First, a projection portion of the magnetic body 1 is mounted on the receiving tool 15 so as to be fitted to the inner hole of the receiving tool 15 and thereafter the chuck 16e is moved forward and backward on an inner circumferential face side of the receiving tool 15. Thereby, the magnetic body 1 is held by the receiving tool 15 and the chuck 16e. And thereafter, by moving down the movable plate 16b, the magnetic body 1 is interposed between the magnetizing yoke 12 and the receiving tool 15. Thereafter, predetermined electric current is flowed into the coil 12b and the magnetic body 1 is magnetized.

Figure 7A:
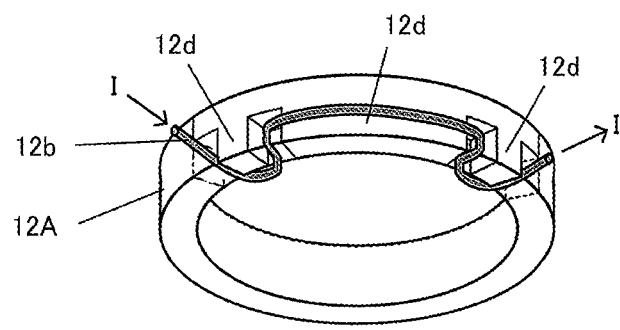
FIGS. 7A to 7C are perspective views of the plurality of magnetizing yokes.
Figure 7B:
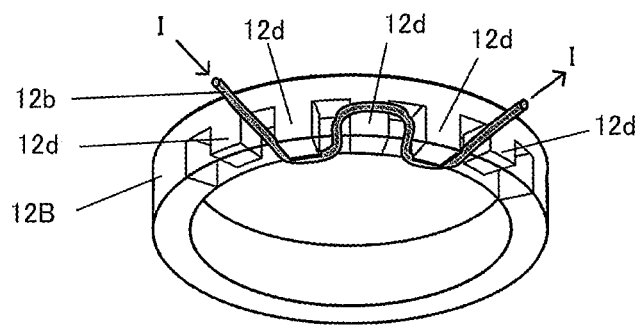
Figure 7C:
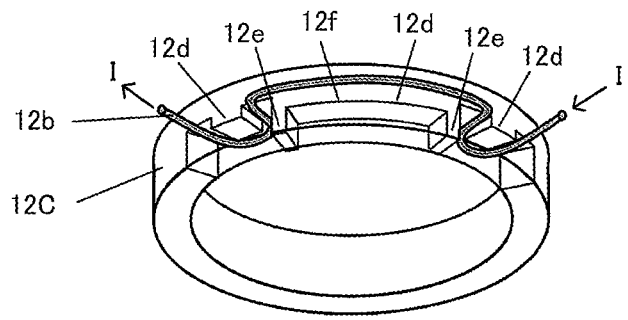

FIGS. 7A to 7C are perspective views of a plurality of magnetizing yokes 12A . . . used in the embodiment. In the embodiment, by using the plurality of magnetizing yokes 12A . . . , the objective magnetized state that presents at least the half wavelength pulse of the objective sine wave in a one-dimensional region of the magnetic body 1 is formed.

An action principle of the magnetization apparatus 10 is briefly explained below. First, magnetism in one direction is applied to an entire half wavelength interval of the objective sine wave on the magnetic body by a first yoke 12A and a magnetized state of a first-order rectangle wave or of a first-order trapezoidal wave that presents polarity information in a rectangle or trapezoidal pulse shape is formed in the interval. Thereafter, magnetism in opposite direction is applied to a start point and a terminal point of the interval by a second yoke 12B and further by a third yoke 12C one time or several times and the magnetized state of the first-order rectangle wave or of the first-order trapezoidal wave is changed into the objective magnetized state.

Magnetism in opposite direction applied to the start point and the terminal point of the interval for a first time is magnetism that forms, in the magnetic body 1, a magnetization region that presents the half wavelength pulse of the opposite phase of the third-order harmonic of the objective sine wave, and can be applied respectively to one third of the regions on the start point side and the terminal point side of the interval by the second yoke 12B.

Magnetism in opposite direction applied to the start point and the terminal point of the interval for a second time is magnetism that forms, in the magnetic body 1, a magnetization region that presents the half wavelength pulse of the opposite phase of the fifth-order harmonic of the objective sine wave, and can be applied respectively to one fifth of the regions on the start point side and the terminal point side of the interval by the third yoke 12C.

In a magnet magnetized by the magnetization apparatus 10 in the embodiment, the tolerance at the zero crossing point of the objective sine wave is suppressed, which is similar to the above.

FIG. 7A is one example of the first yoke. In the example, the magnetic body 1 and the receiving tool 15 are illustrated with the first yoke 12A.

A plurality of magnetic poles 12d . . . are formed on an end face on one side of the first yoke 12A. A wide magnetic pole 12d at a central part is for forming the magnetized state of the first-order trapezoidal wave. Between the magnetic poles 12d, a coil 12b made of copper, aluminum, or the like is arranged. If spaces between the magnetic poles 12d . . . are filled with resin or the like after putting through the coil 12b, a contacting ability to the magnetic body 1 becomes satisfactory.

The first yoke 12A and the receiving tool 15 constitute an electric circuit by switching the magnetic body 1.

FIG. 7B is one example of the second yoke. The second yoke 12B is in an annular shape and has the same inner and outer diameters with the first yoke 12A, and the plurality of magnetic poles 12d are formed on an end face on one side of the second yoke 12B. Three of five magnetic poles 12d . . . at a central part in the figure are the magnetic poles 12d for forming the third-order harmonic magnetized state. Outer two magnetic poles 12d are formed lower for adjusting magnetic resistance.

FIG. 7C is one example of the third yoke. The third yoke 12C is an annular shape and has the same inner and outer diameters with the first yoke 12A, and the plurality of magnetic poles 12d are formed on an end face on one side of the third yoke 12C. In wide magnetic poles 12d . . . of the central part, both ends 12e . . . are formed higher and a middle portion 12f is formed lower. The both ends 12e . . . form the fifth-order harmonic magnetized state. Two outer magnetic poles 12d . . . are formed lower for adjusting magnetic resistance.

In the embodiment, the power supply device 14 of a capacitor-type can be used. Namely, a large-capacity capacitor is configured to be charged to a predetermined voltage in a cut-off state in advance and thereafter to flow large current at once to the coil 12b by short-circuiting the capacitor and the coil 12b. In the above, an electric wire of the coil 12b can be made large in diameter and thereby magnetic resistance is made smaller. In the first yoke 12A, the second yoke 12B, and the third yoke 12C, a charge voltage can be changed respectively.

Figure 8A:
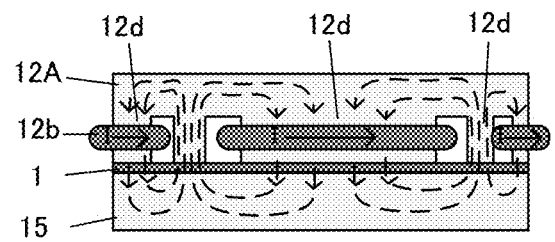
FIGS. 8A to 8C are side views in a chronological order that illustrate a process of a magnetization treatment using the plurality of magnetizing yokes.
Figure 8B:
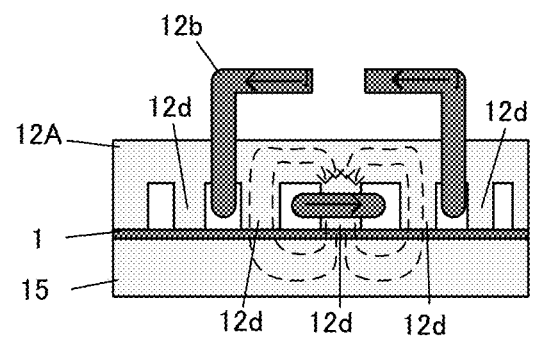
Figure 8C:
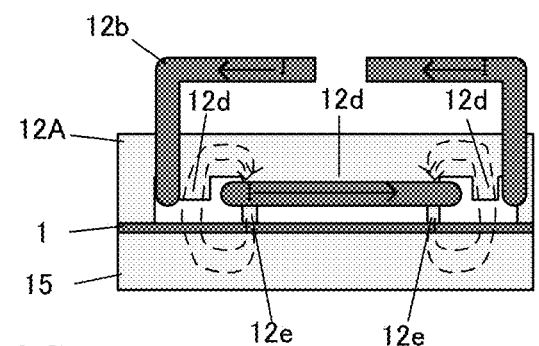

FIGS. 8A to 8C are side views in a chronological order that illustrate a process of a magnetization treatment using the first yoke, the second yoke, and the third yoke.

Figure 10A:
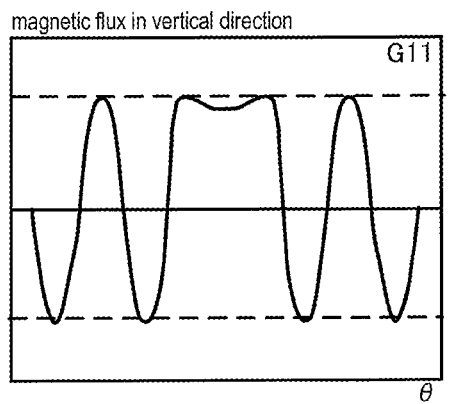
FIGS. 10A to 10C are all graphic charts for explaining a basic operation of the magnetization apparatus illustrated in FIG. 9A.

FIG. 8A illustrates a process in which the magnetized state of the first-order trapezoidal wave is formed in the magnetic body 1 by the first yoke 12A. Magnetism generated when an electric current is flowed into the coil 12b arranged at the first yoke 12A is illustrated by the broken line. By such a treatment, the magnetized state of the first-order trapezoidal wave presenting the waveform as illustrated in a graphic chart G11 of FIG. 10A is obtained.

Figure 10B:
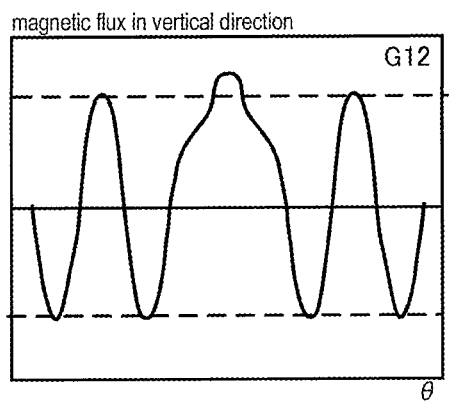

FIG. 8B illustrates a process that forms the third-order harmonic magnetized state in a superimposed manner by the second yoke 12B in the magnetic body 1 in which the magnetized state of the first-order trapezoidal wave is formed by the process illustrated in FIG. 8A. Magnetism generated when the electric current is flowed into the coil 12b arranged at the second yoke 12B is illustrated by the broken line. By such a treatment, the third-order harmonic magnetized state presenting a waveform as illustrated in a graphic chart G12 of FIG. 10B is obtained, and the magnetized state can be deemed as the objective magnetized state.

Figure 10C:
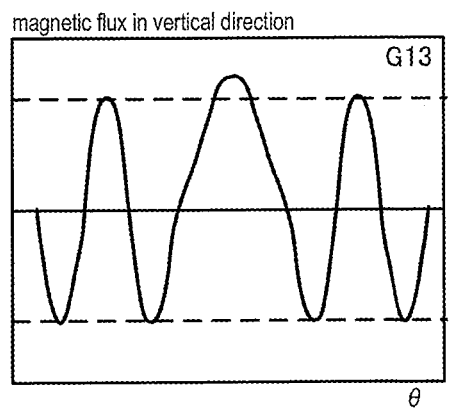
Figure 11A:
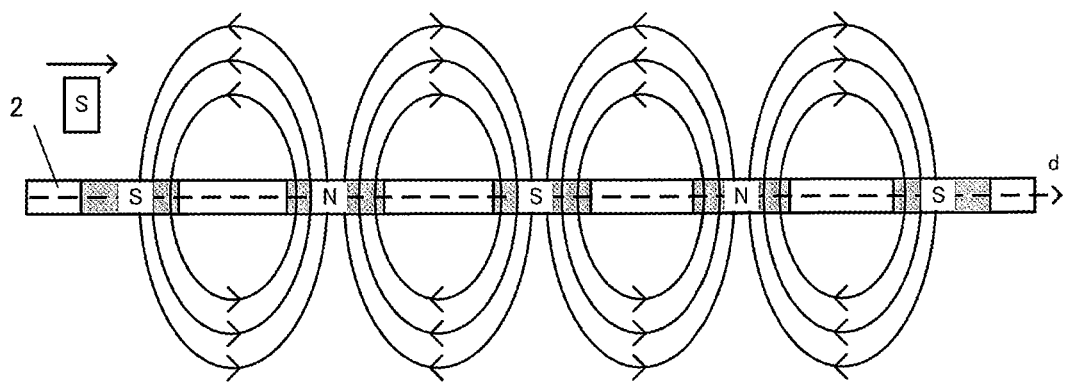
FIGS. 11A and 11B are charts illustrating a state of the magnet for the magnetic encoder.
Figure 11B:
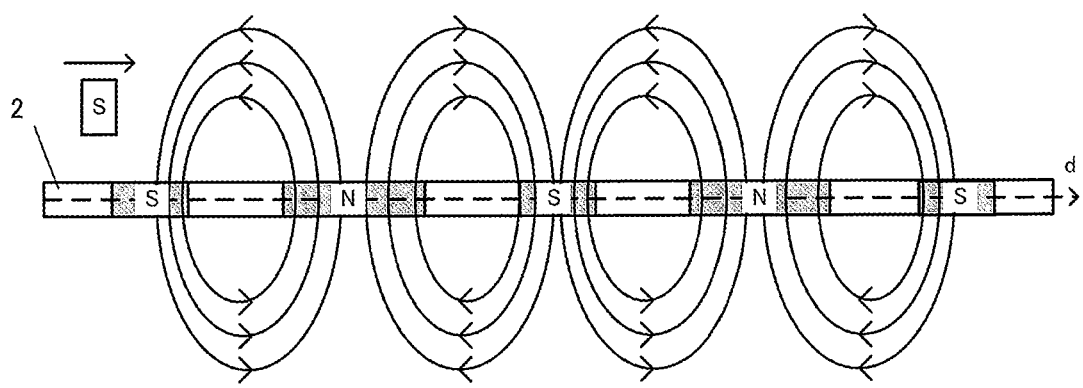
Figure 11C:
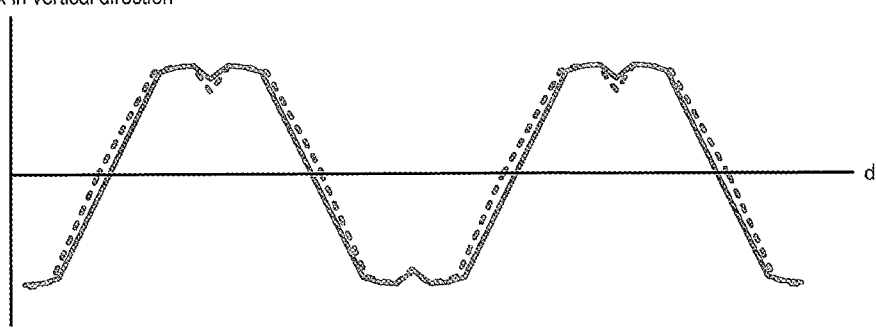
FIG. 11C is a graphic chart of the detection signal of the magnetic sensor, which is a conventional art.

FIG. 8C illustrates a process that forms the fifth-order harmonic magnetized state in a further superimposed manner by the third yoke 12C in the magnetic body 1 in which the third-order harmonic magnetized state is formed by the process illustrated in FIG. 8B. Magnetism generated when the electric current is flowed into the coil 12b arranged at the third yoke 12C is illustrated by the broken line. By such a treatment, the fifth-order harmonic magnetized state presenting a waveform as illustrated in a graphic chart G13 of FIG. 10C is obtained, and the magnetized state can be deemed as the objective magnetized state.

Figure 9A:
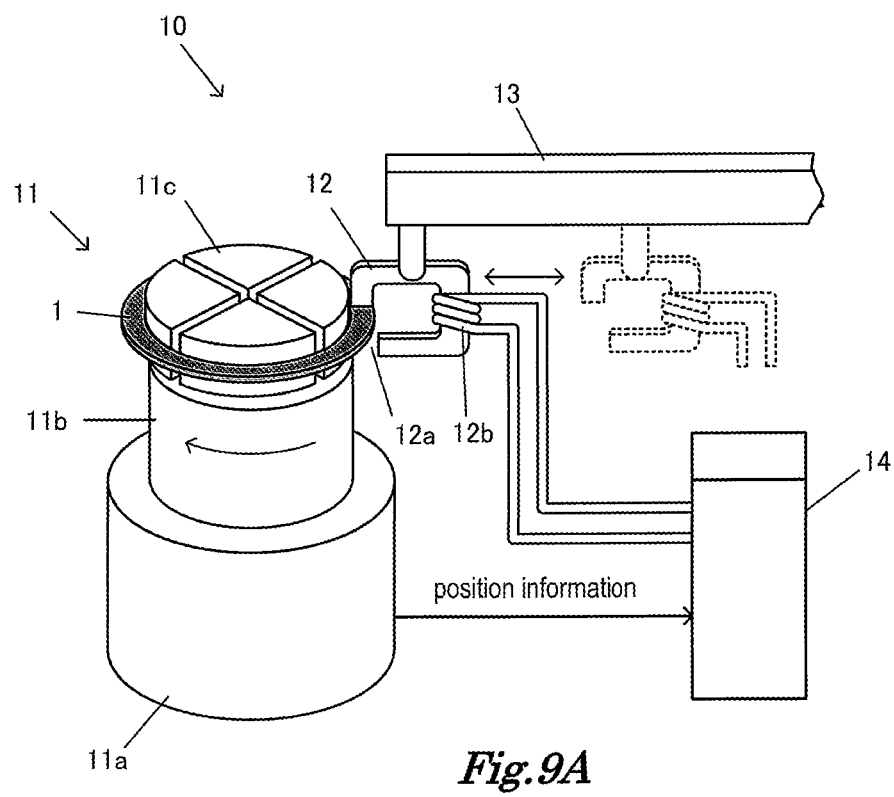
FIG. 9A is an entire perspective view of the magnetization apparatus as another example of the embodiment.
Figure 9B:
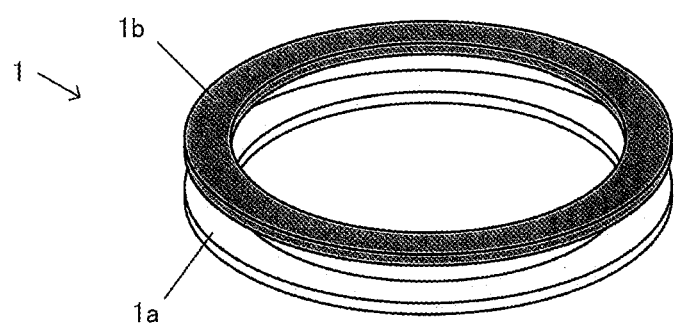
FIG. 9B is an exploded perspective view of the magnetic body to be magnetized.

A magnetization apparatus as another example of the embodiment is further explained below. FIG. 9A is an entire perspective view of the magnetization apparatus. FIG. 9B is an exploded perspective view of the magnetic body to be magnetized.

The magnetic body 1 to be the magnet 2 is assumed to be in a disk shape illustrated in FIG. 1A. Specifically, as illustrated in FIG. 9B, the magnetic body 1 is in a circular shape having a predetermined circumference, and is made in such a manner that the magnetic member 1b is fixed to an all over surface of a disk-shaped core member 1a made of magnetic metal such as SPCC or SUS430. On the other hand, the magnetic member 1b is the rubber molding article, the resin molding article in which hard magnetic powder such as alnico and ferrite is contained, or the sinter of the hard magnetic powder. If the magnetic encoder is used for a vehicle, the magnetic member 1b with a high Curie temperature and with shock resistance is used. It is better to entirely demagnetize the magnetic body 1 in advance by heating up to a temperature equal or more than a Curie temperature.

As illustrated in FIG. 9A, the magnetization apparatus 10 is constituted with a spindle device 11 that rotationally moves the magnetic body 1, the magnetizing yoke 12, a magnetizing yoke holding device 13, and the power supply device 14.

In the spindle device 11, for instance, a stepping motor 11a or the like is used as a drive source, motive power thereof is transmitted by a motive power transmission system that is not illustrated and provided in the device, and thereby the base 11b is rotationally moved. The base 11b is provided with a chuck 11c holding a magnetic member 2. The chuck 11c is made by double wing movable pieces having shapes in which a circular cylinder is divided into quarters, the movable pieces are moved into diameter expansion direction or diameter reduction direction, and thereby the magnetic body 1 is held or released from an inner side. The drive source is not limited to the stepping motor 11a and any motors of which rotational speed is accurately controlled is adoptable as the drive source.

The magnetizing yoke 12 is substantially in a C shape, and has a gap 12a for applying magnetism to the magnetic body 1. Material of the magnetizing yoke 12 can be soft magnetic metal such as iron, Permalloy, and SS400; or can also be soft magnetic powder such as Sendust. A shape or a dimension of the gap 12a of the magnetizing yoke 12 is appropriately set in accordance with a cross-sectional shape of the magnetic body 1, and can be basically such that each part of the magnetic body 1 penetrates and passes through at least the gap 12a in a non-contact manner. The magnetizing yoke 12 is wound by the coil 12b made of a copper wire or the like except for the gap 12a. Coil turns and number of the coil 12b are not limited in particular.

The magnetizing yoke holding device 13 is configured to hold the magnetizing yoke 12 at a specified position relative to the magnetic body 1 held by the spindle device 11 and to retreat the magnetizing yoke 12 from the specified position. In the above case, the magnetizing yoke 12 is horizontally moved but is not limited to such a movement. If the magnetizing yoke 12 is configured to freely decide positioning relative to the magnetic body 1, the magnetic body 1 in a different size is able to be magnetized without any problem.

The power supply device 14 supplies a power source at a pre-set voltage level to the coil 12b wound to the magnetizing yoke 12. More specifically, the voltage level, polarity, timing, or the like of the power source is able to be programmed. As a behavior corresponding to such a program, position information of the magnetic body 1, i.e. information such as the angle θ illustrated in FIG. 1A, is received from the spindle device 11. Based on the position information, a power source at a plus or minus constant level is supplied to the coil 12b or the power source is cut off In a case in which the magnetization apparatus 10 forms, in a one-dimensional region of the magnetic body 1, the objective magnetized state presenting the half wavelength pulse of the objective sine wave, magnetism in one direction is applied to the entire half wavelength interval of the objective sine wave on the magnetic body while the magnetizing yoke 12 is relatively moved to the magnetic body 1; and the magnetized state of the first-order rectangle wave or of the first-order trapezoidal wave that presents the polarity information in the rectangle or trapezoidal pulse shape is formed in the interval. Thereafter, magnetism in opposite direction is applied to the start point and the terminal point of the interval one time or several times while the magnetizing yoke 12 is relatively moved to the magnetic body 1, and the magnetized state of the first-order rectangle wave or of the first-order trapezoidal wave is changed into the objective magnetized state.

In the above case, magnetism in opposite direction applied to the start point and the terminal point of the interval for the first time is magnetism that forms, in the magnetic body 1, the magnetization region presenting the half wavelength pulse of the opposite phase of the third-order harmonic of the objective sine wave and can be applied respectively to one third of the regions on the start point side and the terminal point side of the interval.

Magnetism in opposite direction applied to the start point and the terminal point of the interval of the interval for the second time is magnetism that forms, in the magnetic body 1, the magnetization region presenting the half wavelength pulse of the opposite phase of the fifth-order harmonic of the objective sine wave and can be applied respectively to one fifth of the regions on the start point side and the terminal point side of the interval.

If a behavior regarding the half wavelength pulse of the objective sine wave as above is set to repeat in the entire region while changing the polarity at every half wavelength interval, such a magnetized region presenting continuous objective sine waves in the entire one-dimensional region is able to be formed. Also in the magnet magnetized by the magnetization device 10, tolerance at the zero crossing point of the objective sine wave is suppressed similarly to the above.

A concrete example of magnetization is to be explained below.

FIGS. 10A to 10C are graphic charts that illustrate waveforms respectively presented by the magnetized state of the first-order trapezoidal wave, the third-order harmonic magnetized state, and the fifth-order harmonic magnetized state that are magnetized by the magnetization apparatus.

The graphic chart G11 of FIG. 10A illustrates the magnetized state of the first-order trapezoidal wave that is formed in the magnetic body 1. In the graphic chart G11, a horizontal axis illustrates the position of the one-dimensional region of the magnetic body 1; and a vertical axis illustrates the size of the magnetic flux of the specific direction, i.e. the orthogonal direction, in the respective positions.

The graphic chart G12 of FIG. 10B illustrates the magnetized state after the third-order harmonic magnetized state is formed in the magnetic body 1 in the superimposed manner. In the graphic chart G12, a horizontal axis illustrates the position of the one-dimensional region of the magnetic body 1; and a vertical axis illustrates the size of the magnetic flux of the specific direction, i.e. the orthogonal direction, in the respective positions.

The graphic chart G13 of FIG. 10C illustrates the magnetized state after the fifth-order harmonic magnetized state is formed in the magnetic body 1 in the superimposed manner. In the graphic chart G13, a horizontal axis illustrates the position of the one-dimensional region of the magnetic body 1; and a vertical axis illustrates the size of the magnetic flux of the specific direction, i.e. the orthogonal direction, in the respective positions.

REFERENCE SIGNS LIST

1 magnetic body
2 magnet
PP half wavelength pulse
12 magnetizing yoke
12A first yoke
12B second yoke
12C third yoke

The invention claimed is:

1. A magnetization method for forming an objective magnetized state presenting a half wavelength pulse of a sine wave in a one-dimensional region of a magnetic body, the magnetization method comprising:
   applying magnetism in one direction to an entire half wavelength interval of the sine wave on the magnetic body by a magnetizing yoke and forming a magnetized state of a first-order rectangle wave or of a first-order trapezoidal wave in the interval, the magnetized state presenting polarity information in a rectangle or trapezoidal pulse shape, and thereafter,
   applying magnetism in opposite direction to a start point and a terminal point of the interval by the same magnetizing yoke or a different magnetizing yoke one time or several times and changing the magnetized state of the first-order rectangle wave or of the first-order trapezoidal wave into the objective magnetized state.

2. The magnetization method as set forth in claim 1,
   wherein magnetism in opposite direction is applied respectively to one third of regions on a start point side and on a terminal point side of the interval, the magnetism in opposite direction applied to the start point and the terminal point of the interval for a first time being the magnetism that forms, in the magnetic body, a third-order harmonic magnetization region presenting a half wavelength pulse of an opposite phase of a third-order harmonic of the sine wave.

3. The magnetization method as set forth in claim 2,
   wherein magnetism in opposite direction is applied respectively to one fifth of the regions on the start point side and on the terminal point side of the interval, the magnetism in opposite direction applied to the start point and the terminal point of the interval for a second time being the magnetism that forms, in the magnetic body, a fifth-order harmonic magnetization region presenting a half wavelength pulse of an opposite phase of a fifth-order harmonic of the sine wave.

4. A magnetization apparatus comprising a plurality of magnetizing yokes and forming an objective magnetized state presenting at least a half wavelength pulse of a sine wave in a one-dimensional region of a magnetic body,
   wherein magnetism in one direction is applied to an entire half wavelength interval of the sine wave on the magnetic body by a first yoke in the plurality of magnetizing yokes and a magnetized state of a first-order rectangle wave or of a first-order trapezoidal wave presenting polarity information in a rectangle or trapezoidal pulse shape is formed in the interval, and thereafter,
   wherein magnetism in opposite direction is applied to a start point and a terminal point of the interval by a yoke that is different from the first yoke in the plurality of magnetizing yokes one time or several times and the magnetized state of the first-order rectangle wave or of the first-order trapezoidal wave is changed into the objective magnetized state.

5. The magnetization apparatus as set forth in claim 4,
   wherein magnetism in opposite direction is applied respectively to one third of regions on a start point side and on a terminal point side of the interval by a second yoke in the plurality of magnetizing yokes, the magnetism in opposite direction applied to the start point and the terminal point of the interval for a first time being the magnetism that forms, in the magnetic body, a third-order harmonic magnetization region presenting a half wavelength pulse of an opposite phase of a third-order harmonic of the sine wave.

6. The magnetization apparatus as set forth in claim 5,
   wherein magnetism in opposite direction is applied respectively to one fifth of the regions on the start point side and on the terminal point side of the interval by a third yoke in the plurality of magnetizing yokes, the magnetism in opposite direction applied to the start point and the terminal point of the interval for a second time being the magnetism that forms, in the magnetic body, a fifth-order harmonic magnetization region presenting a half wavelength pulse of an opposite phase of a fifth-order harmonic of the sine wave.

7. A magnetization apparatus comprising a magnetizing yoke and forming an objective magnetized state presenting at least a half wavelength pulse of a sine wave in a one-dimensional region of a magnetic body,
   wherein magnetism in one direction is applied to an entire half wavelength interval of the sine wave on the magnetic body while the magnetizing yoke is relatively moved to the magnetic body and a magnetized state of a first-order rectangle wave or of a first-order trapezoidal wave presenting polarity information in a rectangle or trapezoidal pulse shape is formed in the interval, and thereafter,
   wherein magnetism in opposite direction is applied to a start point and a terminal point of the interval one time or several times while the magnetizing yoke is relatively moved to the magnetic body and the magnetized state of the first-order rectangle wave or of the first-order trapezoidal wave is changed into the objective magnetized state.

8. The magnetization apparatus as set forth in claim 7,
   wherein magnetism in opposite direction is applied respectively to one third of regions on a start point side and on a terminal point side of the interval, the magnetism in opposite direction applied to the start point and the terminal point of the interval for a first time being the magnetism that forms, in the magnetic body, a third-order harmonic magnetization region presenting a half wavelength pulse of an opposite phase of a third-order harmonic of the sine wave.

9. The magnetization apparatus as set forth in claim 8,
   wherein magnetism in opposite direction is applied respectively to one fifth of the regions on the start point side and on the terminal point side of the interval, the magnetism in opposite direction applied to the start point and the terminal point of the interval for a second time being the magnetism that forms, in the magnetic body, a fifth-order harmonic magnetization region presenting a half wavelength pulse of an opposite phase of a fifth-order harmonic of the sine wave.

10. A magnet for a magnetic encoder formed with a magnetized state presenting a sine wave in a one-dimensional region of a magnetic body,
   wherein position tolerance at a zero crossing point of the sine wave is equal to or less than one twelfth of the sine wave.

* * * * *